United States Patent [19]

Hoashi

[11] Patent Number: 4,818,556
[45] Date of Patent: Apr. 4, 1989

[54] KONNYAKU PRODUCTS

[75] Inventor: Chikako Hoashi, Tokyo, Japan

[73] Assignee: Yugenkaisha Matsubei, Tokyo, Japan

[21] Appl. No.: 183,402

[22] Filed: Apr. 11, 1988

Related U.S. Application Data

[63] Continuation of Ser. No. 864,247, May 19, 1986, abandoned.

[30] Foreign Application Priority Data

May 28, 1985 [JP] Japan ................................. 60-79937
Dec. 16, 1985 [JP] Japan ................................. 60-193303
Jan. 17, 1986 [JP] Japan .................................. 61-4793

[51] Int. Cl.⁴ .......................................... A23L 1/214
[52] U.S. Cl. .................................... 426/615; 426/144; 426/104
[58] Field of Search ......................... 426/615, 144, 104

[56] References Cited

U.S. PATENT DOCUMENTS 4,027,044 5/1977 Taylor ................................ 426/96

FOREIGN PATENT DOCUMENTS 146561 8/1984 Japan .

OTHER PUBLICATIONS

Chinese Cooking, Foods of the World, Time-Life Books 1968, New York, pp. 68–69.
The Cooking of Japan, Food of the World, Time-Life Books, 1968, New York, pp. 92–93.
Family Circle, Illustrated Library of Cooking vol. 15, 1972, New York, p. 1866.

Primary Examiner—Jeanette Hunter
Attorney, Agent, or Firm—Beveridge, DeGrandi & Weilacher

[57] ABSTRACT

Konnyaku products with notches are provided. These products exhibit an improved taste and texture not attained in prior art products, in addition to enhanced absorption of seasoning solution by the products. The konnyaku products according to the present invention can be used advantageously as a food ingredient for cooking and other purposes.

4 Claims, 6 Drawing Sheets

KONNYAKU PRODUCTS

BACKGROUND OF THE INVENTION

This application is a continuation of Ser. No. 864,247 filed May 19, 1986, now abandoned.

1. Field of the Invention

The present invention relates to "konnyaku" products, i.e., food products produced from an elephant foot. (Amorphophallus Konjac K. Koch) More particularly, the present invention relates to notched konnyaku products having an improved texture and taste.

2. Description of the Prior Art

Hitherto, konnyaku products have been produced using a fresh bulb of elephant foot or a powdered elephant foot. The bulb of elephant foot is first ground and grated. The powdered or grated elephant foot is then mixed and kneaded with water to make a paste. The paste is produced because mannan grains of the elephant foot swell with the addition of water. After kneading, the paste is solidified with an alkaline solution such as a milk of lime, sodium carbonate, sodium hydroxide or the like, molded and finally treated with heat.

Konnyaku products have been effectively used for various cooking purposes and recently used as a diet or low calorie food. For example, they are used in cooking of oden (Japanese hotchpotch), sukiyaki, dishes cooked at the table, or other dishes. The konnyaku products, however, tends to insufficiently absorb stock and seasoning solution and therefore have unsatisfactory taste. Further, these products suffer from their simple texture.

For the purpose of improving absorption of the seasoning solution, it is disclosed in Japanese Unexamined Utility Model Publication (Kokai) No. 56-96988 to make a plurality of openings in the konnyaku products. For the same purpose, Japanese Unexamined Patent Publication (Kokai) No. 59-146561 discloses a grid-like cut pattern in a surface of the konnyaku products.

As is apparent from the above explanation, attempts to form openings or cut patterns in the konnyaku products have been made in a food industry. But, all of them intend only to improve penetration of seasoning liquid into the konnyaku products. In fact, they have not been directed to improving the texture or similar properties of the resulting konnyaku products.

Alternatively, the konnyaku products have been sometimes eaten as a raw food, so-called "sashimi-konnyaku", without cooking. Sashimi-konnyaku, as in "sashimi" (fresh slices of raw fish), is eaten after seasoning with soy sauce with "wasabi". Wasabi is Japanese horseradish and frequently is used as a seasoning in Japanese dishes.

The sashimi-konnyaku is a slice of freshly produced konnyaku and therefore has a notable crispiness which is inherent to the konnyaku. It is the case that the sashimi-konnyaku can not provide sufficient sashimi-like texture, while such texture is essential to this type of konnyaku.

It is, therefore, an object of the present invention to provide konnyaku products having an improved texture in addition to good flavor because of satisfactory seasoning.

SUMMARY OF THE INVENTION

According to the present invention, there are provided new types of konnyaku products which have slits or notches cut at certain intervals parallel to each other and therefore have a configuration of partially connected thin pieces of konnyaku in piles.

For the present konnyaku products, satisfactory seasoning can be effectively attained because a seasoning solution can enter the notched portions or gaps between the konnyaku pieces and be carried therein. In addition to satisfactory seasoning and hence good taste, good texture can be obtained in the present products. This is because their thin pieces have a moderate elasticity and are separated in mouth when eaten.

DESCRIPTION OF THE PREFERRED EMBODIMENTS

Figure 1:
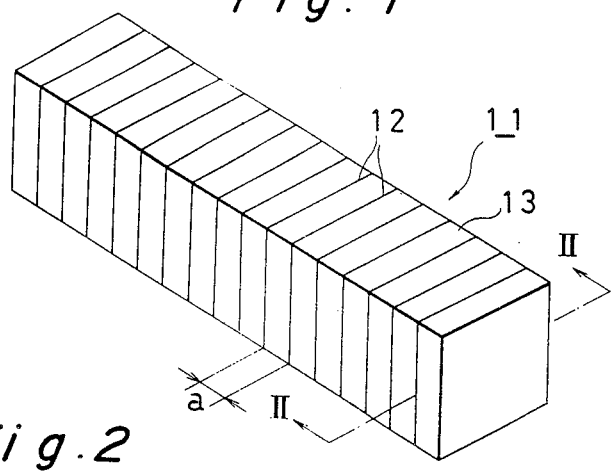
FIG. 1 is a perspective view showing an example of the konnyaku products according to the present invention.

In the present invention, the konnyaku products are generally molded or cut to different shapes such as a square rod, a cylindrical rod, a rectangular parallelopiped, cube, a tail of a shrimp or the like, for example. Further, these konnyaku products have different slits or notches in their surface(s). The slits or notches of the present konnyaku products may have any desired configuration and distribution. As typical examples, (i) they may be made in a peripheral surface of the konnyaku product in certain intervals and be parallel to each other. (ii) They may be formed to a predetermined depth on two opposite surfaces of the konnyaku product so that the central portion of the product is not notched. Adjacent notches are parallel to each other with a constant interval between these notches. (iii) They may be formed on the only one surface of the konnyaku product and extend deeply to near its opposite surface. As in the above cases, they are parallel to each other with a constant interval. (iv) They may be in the form of a spiral formed around a peripheral surface of the konnyaku product. (v) They may be longitudinal extended in and cut through the konnyaku product in parallel. They do not extend to the end portions of the konnyaku product in order to maintain the products as konnyaku. Other types of slits or notches may be in the konnyaku products of the present invention so long as they are within the scope of the present invention.

According to a preferred embodiment of the present invention, the slits or notches of the konnyaku products are in parallel at a distance of less than 5 mm and their depth is 2 mm or more. Further, a cross-section of the konnyaku product parallel to a plane of notches preferably has a maximum length or diameter of 6 cm or less.

When the notches are formed at a distance of less than 5 mm and are cut to a depth of 2 mm or more in the konnyaku products, a seasoning solution used for cooking purposes will sufficiently penetrate the products and the texture of the konnyaku products will be further improved. Particularly, when the notched konnyaku products are eaten as a sashimi-konnyaku with soy sauce with or without wasabi, excellent flavor such as that of fresh shrimp will be attained. This is because the taste of the konnyaku is relatively light and plain and is similar to that of fresh shrimp, and the structure and form of the notched konnyaku in which a plurality of thin pieces of konnyaku are laminated and partially connected is similar to that of the tail portion of shrimp. In addition, both of them have similar physical properties such as elasticity and smoothness, for example. In this respect, it may be noted that the Japanese spiny lobster has a tail portion comprising piled thin layers of the thickness of 2 to 3 mm.

If the spacing between the notches on the konnyaku products is increased to 5 mm or more, the resulting notched konnyaku products will have a texture which is similar to the prior art konnyaku products because of increase of the thickness of each of konnyaku pieces. It is, therefore, difficult to obtain a specific texture of the present invention described above. Also, if the depth of the notches is less than 2 mm, the resultant products will indicate less improved taste based on the presence of konnyaku pieces.

According to another preferred embodiment of the present invention, the notches are spaced at 4 mm or less and have a depth of 3 mm or more. More preferably, the distance between the notches is 3 mm or less is the resulting konnyaku products are to be served as sashimi-konnyaku.

As described in the previous paragraph, a cross-section of the konnyaku products has preferably the maximum length or diameter of 6 cm or less when measured with respect to a plane of the notches formed therein. Applying such maximum diameter in the konnyaku products, it becomes easy to take and eat them in the mouth. Since the konnyaku products have notches along which they may be torn off, they can be separated into single pieces or a portion of two or more pieces. These pieces of the konnyaku, in addition to being remarkably easy to eat, can provide a delicious flavor and a good texture as previously explained. In contrast, the maximum diameter of the cross-section beyond 6 cm will not result in the above advantages and therefore should be avoided. Such a large maximum diameter means that it is hard and difficult to take several pieces of the konnyaku in the mouth at once and also it is unable to attain satisfactory improvement of the taste and texture of the resulting konnyaku products. The inventor further found that, according to a more preferred embodiment of the present invention, the maximum diameter of the cross-section of the konnyaku products is 4 cm or less.

The konnyaku products according to the present invention may be used as an ingredient for various dishes such as oden, sukiyaki, hodgepodge or the like, or alternatively they may be used as a sashimi-like food, "sashimi-konnyaku", without further treatment. In the latter case, it is recommended to eat the sashimi-konnyaku after seasoning with wasabi-dissolved soy sauce, vinegared "miso" (fermented soybean paste) or the like. Moreover, unexpectedly, the present konnyaku products are also suited as a chilled dessert when cooled and coated with any sweetening agent. Suitable sweetening agents in the preparation of the chilled desserts include, for example, honey, molasses, syrup of muscovado sugar, sweetened condensed milk, starch syrup or others. It should be noted that the production of the konnyaku-based chilled desserts has not yet been tried in the field.

The konnyaku products of this invention can be produced in a manner which is similar to that in the production of the prior art konnyaku products. A typical example of these konnyaku products comprises: A paste of konnyaku is first produced using a conventional gelatination process. Bulbs of elephant foot or powders produced therefrom are used as a starting material in the gelatination process. Depending upon the desired konnyaku products, the konnyaku paste may contain any additives which are conventionally used in food industries. Examples of such additives are sub-starting materials such as agar-agar, gelatin, alginic acid, fish meat, livestock meat, vegetable protein, chips or paste from vegetables, starch, albumen, milk or the like and flavors, in addition to green laver, ground sesame seed, red pepper or other seasonings.

Thereafter, the konnyaku paste is alkalified with the addition of an aqueous solution of alkalis such as sodium hydroxide, calcium carbonate, sodium hydrogencarbonate, sodium carbonate, potassium hydroxide or the like, simultaneously kneading. During kneading, the viscosity of the konnyaku paste is gradually increased with time, whereby a half-jelled konnyaku can be produced.

The thus produced half-gelled konnyaku is then molded to any desired shape using conventional molding methods such as casting or extrusion molding. Then, the molded konnyaku is heated to solidify the same. Thermal treatment of the konnyaku may be carried out by dipping the konnyaku in hot water or by steaming it.

The solidified konnyaku is cut to obtain an intended shape such as a square rod, a cylindrical rod, a rectangular parallelopiped, a cube, a tail portion of a shrimp or the like, and finally the shaped konnyaku is fabricated to have the above-discussed slits or notches thereon. Konnyaku products according to the present invention are thus produced.

The present invention will be further described with regard to several examples and the accompanying drawings.

Figure 2:
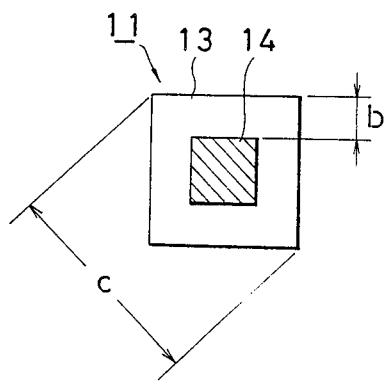
FIG. 2 is a cross-sectional view taken along line II—II of the konnyaku product of FIG. 1.
Figure 3:
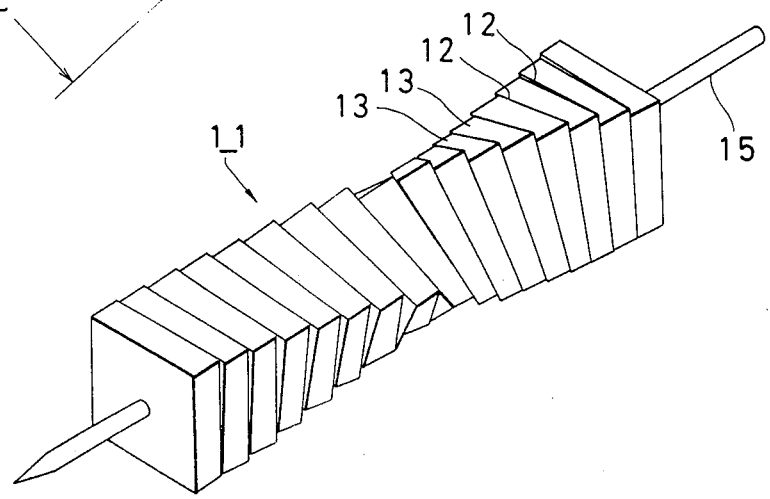
FIG. 3 is a perspective view showing the skewered and twisted konnyaku product of FIGS. 1 and 2.

In FIGS. 1, 2 and 3, there is illustrated one example of the konnyaku products according to the present invention. A konnyaku product 11, as a whole, is in a form of a rod with square end surfaces. In the rod-shaped konnyaku product, parallel notches 12 are formed at a predetermined interval. These notches, as are illustrated, extend perpendicularly to a longitudinal axis of the konnyaku product 11 about the outer peripheral surface of the same. These notches provide a series of connected konnyaku pieces 13 in which adjacent pieces are bonded or connected only by their central portion. The distance "a" between the notches 12, i.e., thickness of the konnyaku piece 13, is less than 5 mm, preferably 4 mm or less, and the depth "b" of the notches 12 is 2 mm or more, preferably 5 mm or more. Further, the maximum length or diameter "c" of the konnyaku product 11, when measured diagonally as is illustrated in FIG. 2, is 6 cm or less, preferably 4 cm or less. Each of the konnyaku pieces 13 are joined with each other by the unnotched central portion 14. Alternatively, in order to improve a design of appearance of the resulting konnyaku product, the konnyaku product 11 of FIG. 1 may be skewered with a longitudinal skewer 14 and twisted as shown in FIG. 3.

The konnyaku product 11, when it is used as a sashimi-like product after seasoning with a wasabi-mixed soy sauce, can provide the impression to eaters that they are eating live shrimps or similar foods. Also, it is very delicious. Such satisfactory results are believed to be obtained based on harmonization of a texture of the konnyaku pieces 13 in piles as well as the smooth surface and light and plain taste of the konnyaku product 11. Moreover, when the konnyaku product 11 is consumed from its end portion, one is free to eat several konnyaku pieces 13 at once by biting them off along the notch 12 positioned at the desired length from the end portion.

Figure 4:
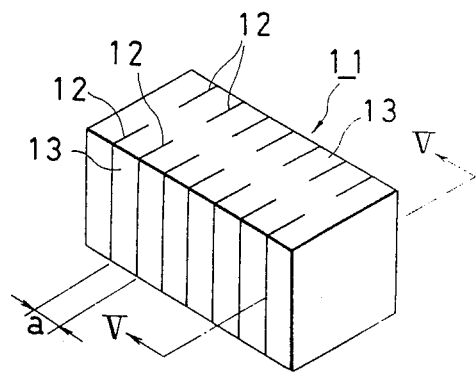
FIG. 4 is a perspective view showing another example of the konnyaku products according to the present invention.
Figure 5:
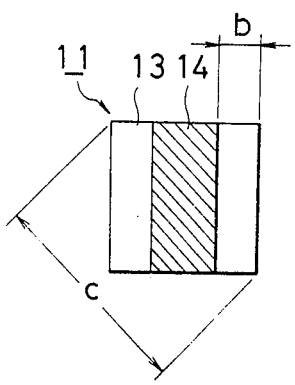
FIG. 5 is a cross-sectional view taken along line V—V of the konnyaku product of FIG. 4.

FIGS. 4 and 5 illustrate another example of the konnyaku products according to the present invention. The konnyaku product 11, as a whole, is shaped into a rod with square end surfaces. Two opposite side surfaces of the konnyaku product 11 each has notches 12 formed in its surface, the notches 12 being parallel to each other and perpendicular to a longitudinal axis of the konnyaku product 11. The notches 12 are formed at a certain interval. The notches 12 on a side surface may be slightly shifted with regard to the corresponding notches on another side surface if desired, although this is not shown in the accompanying drawings. Due to the presence of the notches 12, the konnyaku product 11 is formed as a piled and connected structure from a plurality of konnyaku pieces 13. The spacing "a" and depth "b" of the notches 12 and the maximum diameter "c" of the cross-section of the konnyaku product 11 are the same as those of the konnyaku product 11 described above with reference to FIGS. 1 to 3. As is understood from the illustrations, each konnyaku piece 13 is attached by its central portion 14 to the adjacent konnyaku pieces 13.

Figure 6:
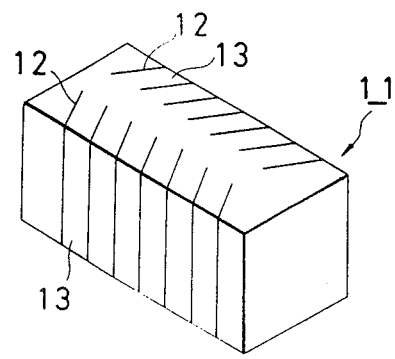
FIG. 6 is a perspective view illustrating still another example of the konnyaku products according to the present invention.

Also, FIG. 6 illustrates another example of the konnyaku products according to the present invention. The illustrated konnyaku product 11 is substantially the same as that of FIGS. 4 and 5 expect that the notches 12 are inclined at a certain angle with respect to the longitudinal axis of the konnyaku product 11. As in FIGS. 4 and 5, the notches 12 on the opposite sides of the konnyaku product 11 are parallel to each other and are formed at the same interval, and, because of the presence of these notches, the konnyaku product 11 is in the form of a piled and connected structure of konnyaku pieces 13.

Figure 7:
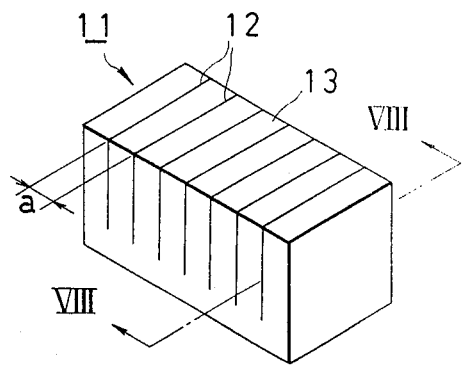
FIG. 7 is a perspective view illustrating still another example of the konnyaku products according to the present invention.
Figure 8:
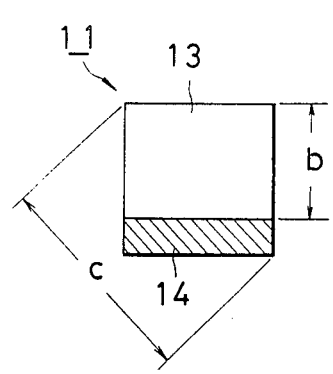
FIG. 8 is a cross-sectional view taken along line VIII—VIII of the konnyaku product of FIG. 7.

In FIGS. 7 and 8, there is shown still another example of the konnyaku products according to the present invention. The konnyaku product 11, before being cut into separate konnyaku pieces 13, is formed as a rod with square end surfaces and has notches 12 on its longitudinally extended side surface (upper surface in the illustrations). The notches 12 are perpendicular to a longitudinal axis of the konnyaku product 11 and have a predetermined and constant interval. In this instance, as is apparent from the drawings, the notches 12 are cut to a considerably deep depth and their tops are positioned just before a surface opposed to the notched surface. A piled and connected structure of konnyaku pieces 13 is thus provided. The spacing "a" and depth "b" of the notches 12 and the maximum diameeter "c" of the cross-section of the konnyaku product 11 are as described above. It will be also understood that the konnyaku pieces 13 are attached to each other by their unnotched portion 14 which is in a lower area of the cross-section of the konnyaku product 11.

Figure 9:
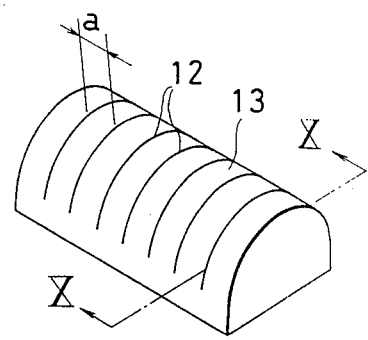
FIG. 9 is a perspective view illustrating still another example of the konnyaku products according to the present invention.
Figure 10:
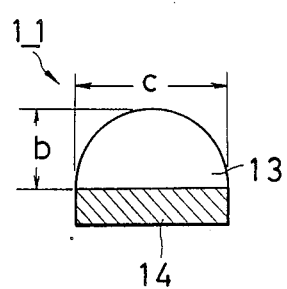
FIG. 10 is a cross-sectional view taken along line X—X of the konnyaku product of FIG. 9.

In FIGS. 9 and 10, there is shown still another example of the konnyaku products according to the present invention. The konnyaku product 11, as a whole, is formed as a rod with semicircular end surfaces and has notches 12 on its round surface (upper surface in the illustrations). The notches 12 are at regular intervals and are perpendicular to a longitudinal axis of the konnyaku product 11. In this instance, the notches 12 are considerably deeply cut and therefore terminate just before the bottom surface opposed to the notched surface. Due to presence of these notches 12, there is provided a pile and connected structure of konnuaku pieces 13. The spacing "a" between the notches 12, the depth "b" of the notches 12 and the maximum diameter "c" of the cross-section parallel to the notches 12 are as described in the above instances. Also, the konnyaku pieces 13 are attached to each other at their unnotched lower portion 14.

Figure 11:
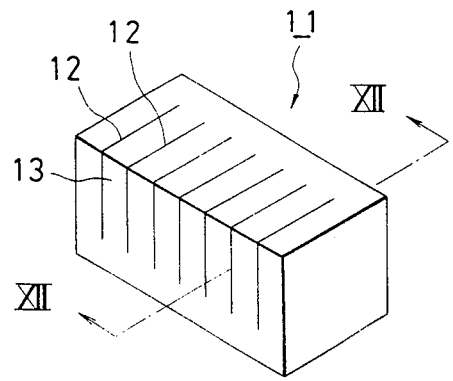
FIG. 11 is a perspective view illustrating still another example of the konnyaku products according to the present invention.
Figure 12:
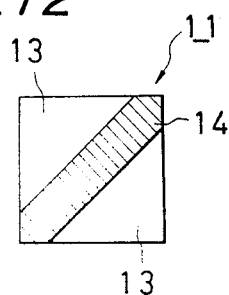
FIG. 12 is a cross-sectional view taken along line XII—XII of the konnyaku product of FIG. 11.

Another example of the konnyaku products according to the present invention is further illustrated in FIGS. 11 and 12. With reference now to these drawings notches 12 are formed at regular intervals on the opposite ridges of the konnyaku product 11. These notches are perpendicular to a longitudinal axis of the konnyaku product 11. As a result, in this instance, there is provided a piled structure of triangular konnyaku pieces 13. Opposite structures of triangular konnyaku pieces 13 are connected through an unnotched portion 4 of the product 11 as is shown in FIG. 12.

Figure 13:
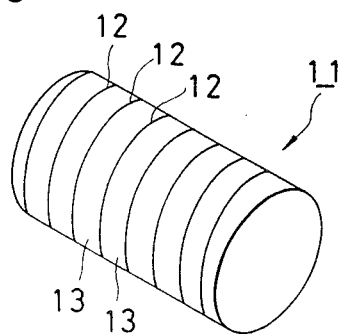
FIG. 13 is a perspective view showing still another example of the konnyaku products in accordance with the present invention.

Still another example of the konnyaku products according to the present invention is illustrated in FIG. 13. The illustrated konnyaku product 11, as a whole, has a form of a rod with its outer peripheral surface cut to define a spiral notch 12. Reference numeral 13 indicates a piece of konnyaku product formed between two adjacent notches 12. A plurality of konnyaku pieces 13 are piled and connected to provide the present konnyaku product 11.

Figure 14:
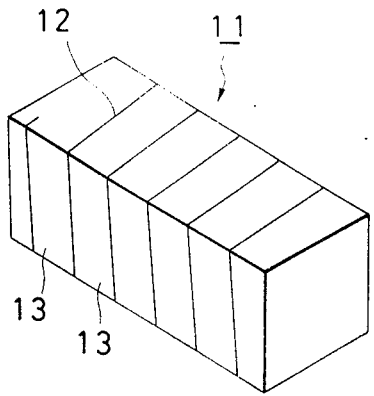
FIG. 14 is a perspective view showing still another example of the konnyaku products in accordance with the present invention.

Also, still another example of the konnyaku products of the present invention is illustrated in FIG. 14. This example is substantially the same as that of FIG. 13 with the exception that square rod shape is used rather than a cylindrical rod shape. Namely, the konnyaku product 11 in the form of a square rod has a spiral notch 12 cut in its outer peripheral surface. Two adjacent notches 12 form a konnyaku piece 13.

Figure 15:
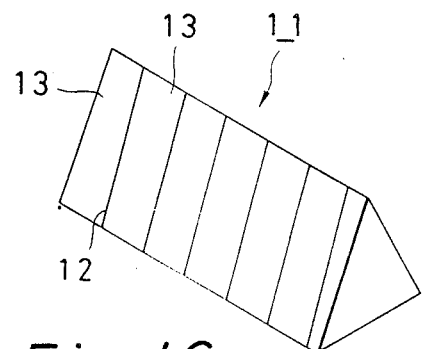
FIG. 15 is a perspective view showing still another example of the konnyaku products in accordance with the present invention.
Figure 16:
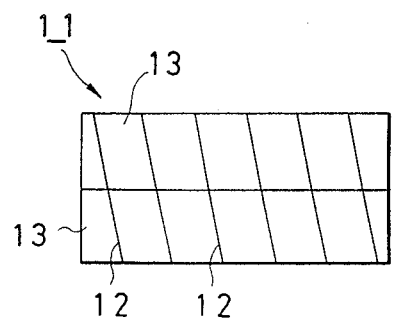
FIG. 16 is a plan view of the konnyaku product of FIG. 15.

In FIGS. 15 and 16, there is illustrated still another example of the konnyaku products according to the present invention. The konnyaku product 11, as is apparent from the perspective view of FIG. 15, is in the form of a triangular prism having regular triangular end surfaces and its outer peripheral surface is cut to have a spiral notch 12. The konnyaku product 11 is provided with a plurality of konnyaku pieces 13 by spiral notch 12.

When a spiral notch 12 is formed in an outer peripheral surface of a konnyaku product, absorption of a seasoning solution by the product is improved. This improvement results because, if the product 11 is twisted in the direction opposite to that of the spiral defined by notches 12 formed therein, the notches are opened sufficiently to receive the seasoning solution. If desired, opened notches 12 can be maintained by threading the konnyaku product 11, at its axis, on a skewer before twisting of the same.

Figure 17:
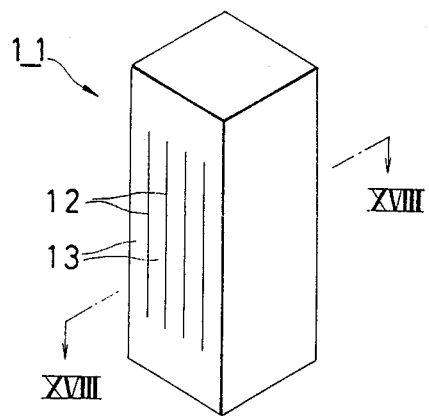
FIG. 17 is a perspective view showing still another example of the konnyaku products in accordance with the present invention.
Figure 18:
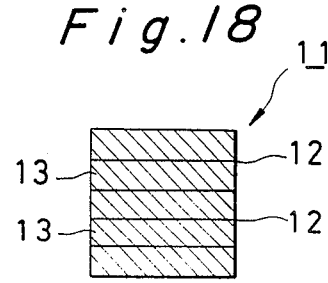
FIG. 18 is a cross-sectional view taken along line XVIII—XVIII of the konnyaku product of FIG. 17.

In FIGS. 17 and 18, there is illustrated still another example of the konnyaku products according to the present invention.

The konnyaku product 11, as a whole, is shaped as a square rod. The end surfaces of which are therefore square. Longitudinally extending parallel notches 12 pass through central portion of the konnyaku product 11 only. Both ends, i.e., the upper and lower portions of the konnyaku product 11 are not notched to sustain the shape of the product and to connect together the konnyaku pieces 13 defined by the notches 12.

SENSORY EVALUATION TEST

Sensory evaluation tests were carried out using the konnyaku products according to the present invention.

Konnyaku products 11 illustrated in FIGS. 1 and 2 were prepared with different spacings "a" between the notches 12. The depth "b" of each notch 12 was 7 mm and tye length of each of four sides of the square cross-section of the product was 2 cm. For evaluation purposes, different samples of the konnyaku products were served to ten test participants assigned letters A to J. These konnyaku products were sampled without further preparation except that they were seasoned with a soy sauce having wasabi. The participant's evaluation of the taste and texture of the tested konnyaku products were made with regard to similarities as to the taste and texture of fresh shrimp. The following results were obtained.

TABLE 1

| participant | spacing between notches, "a" | | | |
|---|---|---|---|---|
| No. | 5.8 mm | 4.8 mm | 3.8 mm | 2.8 mm |
| A | 2 | 2 | 3 | 3 |
| B | 1 | 3 | 3 | 3 |
| C | 1 | 2 | 2 | 3 |
| D | 1 | 3 | 3 | 3 |
| E | 1 | 2 | 3 | 3 |
| F | 1 | 2 | 3 | 3 |
| G | 2 | 3 | 3 | 3 |
| H | 1 | 3 | 3 | 3 |
| I | 1 | 2 | 2 | 3 |

TABLE 1-continued

| participant | spacing between notches, "a" | | | |
|---|---|---|---|---|
| No. | 5.8 mm | 4.8 mm | 3.8 mm | 2.8 mm |
| J | 1 | 2 | 2 | 3 |
| average | 1.2 | 2.4 | 2.7 | 3.0 |

In the above Table 1, the evaluation rating "three (3)" means good, "two (2)" means fair and "one (1)" means bad. Namely, the konnyaku products having a good taste and a texture similar to that of fresh shrimp were given a 3, and the products having a taste and texture similar to that of prior art konnyaku were given a 1, respectively.

The Table 1 indicates that as the spacing "a" between the notches 12 is lessened, the taste and texture of the resulting konnyaku product can be improved more. Particularly, an excellent tasting and textured konnyaku product could be obtained with a spacing "a" between the notches of 2.8 mm, while the interval "a" of 5.8 mm resulted in taste and texture similar to that of prior art konnyaku products.

In addition to the above tests, the konnyaku products 11 of FIGS. 1 to 2 were prepared with notches having a different depth "b". The distance "a" between the notches 12 was 3 mm and the length of each of four sides of the product was 2 cm. The evaluation test was made in the manner described above. The following results were obtained.

TABLE 2

| participant | depth of notches "b" | | | |
|---|---|---|---|---|
| No. | 1 mm | 3 mm | 5 mm | 7 mm |
| A | 1 | 2 | 3 | 3 |
| B | 1 | 3 | 3 | 3 |
| C | 1 | 3 | 2 | 3 |
| D | 1 | 2 | 3 | 3 |
| E | 1 | 2 | 3 | 3 |
| F | 1 | 2 | 3 | 3 |
| G | 1 | 3 | 3 | 3 |
| H | 1 | 2 | 2 | 3 |
| I | 1 | 2 | 2 | 3 |
| J | 1 | 2 | 2 | 3 |
| average | 1.0 | 2.3 | 2.6 | 3.0 |

The rating points "1", "2" and "3" in Table 2 are as defined in the above Table 1.

The Table 2 indicates that with a larger depth "b" of the notches 12, the taste and texture of the resultant konnyaku product can be enhanced. In particular, it should be noted that an excellent shrimp-like taste and texture could be obtained when the depth "b" of the notches 12 on the konnyaku product 11 was 7 mm. By contrast, where the depth "b" of the notches 12 was 1 mm, the konnyaku product 11 was indicated as having a taste and texture substantially the same as that of conventional konnyaku products.

I claim:

1. A konnyaku food product having improved texture, an elongate shape and a cross-section with its sides forming angles when said product is viewed in the direction of the longitudinal axis of said product, said sides of said cross-section, when viewed in said direction of said longitudinal axis, having lengths not exceeding 4 centimeters, said product having a plurality of notches cut in at least two opposite sides thereof to form thin portions for improving the texture of said product, said notches being parallel with a plane forming an angle with said longitudinal axis of said product, said notches on each side being spaced apart at intervals not exceeding 4 millimeters, said notches having depths of at least 3 millimeters, said product having an unnotched central portion, extending along said longitudinal axis thereof, for connecting said plurality of thin portions, said unnotched portion and said notches permitting twisting of said product about its longitudinal axis to generally shift said thin portions with respect to each other to provide longitudinally-extending, spiralling, design-forming ridgelines for said product.

2. The konnyaku food product of claim 1, wherein the improved texture is similar to fresh shrimp.

3. The konnyaku food product of claim 1, wherein the product is uncooked.

4. The konnyaku food product of claim 1, wherein the interval between said notches is 2.8 millimeters, the depth of said notches is 7 millimeters, and the length of said sides of said cross-section viewed in said direction is 2 centimeters.

* * * * *